United States Patent Office 3,781,409
Patented Dec. 25, 1973

3,781,409
STABILIZATION OF HYDROGEN PEROXIDE
Theodore F. Munday, Kendall Park, and Kenneth J. Radimer, Little Falls, N.J., assignors to FMC Corporation, New York, N.Y.
No Drawing. Filed Feb. 28, 1972, Ser. No. 230,067
Int. Cl. C01b 15/02
U.S. Cl. 423—273
9 Claims

ABSTRACT OF THE DISCLOSURE

Hydrogen peroxide is stabilized against decomposition with a high pH stock solution containing a water-soluble tin compound. Preferably a complexing agent is added either to the high pH stock solution or directly to the hydrogen peroxide solution. The resulting stabilized hydrogen peroxide solution has excellent shelf life and superior resistance to contaminant-induced breakdown of the stabilizing chemicals into a sludge.

---

This invention relates to stabilizing hydrogen peroxide against decomposition, especially contaminant-induced decomposition, and results in a stabilized hydrogen peroxide that has superior resistance to the breakdown of the stabilizing chemicals into a sludge.

Some applications for concentrated hydrogen peroxide can result in prolonged storage and therefore stabilized hydrogen peroxide should be capable of prolonged storage without significant decomposition.

Furthermore, many applications require a relatively dilute solution of hydrogen peroxide, less than 40% in water.

The present commercial practice is to produce and ship a concentrated hydrogen peroxide solution, for example 70–90%, for subsequent dilution with water at the point of use to make the desired concentration, usually between 30–50%. This procedure greatly reduces shipping and storage costs because a substantial amount of the water need not be shipped and stored.

However, a serious problem is encountered when the concentrated hydrogen peroxide is diluted at the end use site. Typical water available for dilution at the point of use is not deionized water such as is used in producing hydrogen peroxide. Rather, on-site dilution waters contain various contaminants that induce decomposition of hydrogen peroxide. These decomposition-inducing contaminants include ions of copper, iron and chromium.

The decomposition problems associated with diluting concentrated hydrogen peroxide with water containing decomposition-inducing contaminants were partially solved by adding stabilizer solutions containing tin compounds to the concentrated hydrogen peroxide solution. However, decomposition-inducing cations and other cations such as calcium, which in themselves do not induce decomposition of hydrogen peroxide, can cause precipitation of the tin in the stabilizing stannate sol in the form of a sludge with consequent destabilization of the peroxide solution. A stabilized hydrogen peroxide solution can tolerate the presence of such cations up to some threshold level at which level the stabilizing system tends to break down and form a sludge which precipitates to the bottom of the storage tank.

This precipitation of sludge is a serious problem. The sludge interferes with the use of the hydrogen peroxide and causes increased corrosion of aluminum storage tanks at aluminum sites covered by the sludge. When a sludging condition has occurred, costly cleaning and repassivation of the tanks are required.

Stabilizing systems are known for hydrogen peroxide employing a water-soluble tin compound usually in combination with a complexing agent. Such stabilizing systems are described in U.S. Pats. 1,958,204; 2,872,293; 2,904,517; 3,114,606; 3,383,174; 3,387,939 and 3,591,341. These patents describe various procedures for stabilizing hydrogen peroxide solutions using a water-soluble tin compound. Generally an aqueous stock solution is prepared by adding the water-soluble tin compound to an aqueous solution. Such a stock solution normally has a pH of about 11.5. A complexing agent, such as a phosphonic acid, is often added to the stock solution and the pH of this aqueous stock solution is lowered usually to about 9 or below, and added to the hydrogen peroxide solution to be stabilized.

The prior art teaches formulating a stock solution containing a water-soluble tin compound (usually in combination with a complexing agent) in which the pH of the stock solution by (a) adding to an aqueous solution be-given by the solution of the tin compound, sometimes even to the natural pH of the hydrogen peroxide solution to be stabilized, for example 3 to 5.

This invention, described in summary form, provides a method for preparing a high pH stock solution and stabilizing a hydrogen peroxide solution with the stock solution. The novel high pH stock solution contains a water-soluble tin compound preferably in combination with a complexing agent. The method comprises: adding the water-soluble tin compound to an aqueous solution; raising the pH of the solution with a suitable caustic to above 12, preferably 13.5 to 14.5, to provide a high pH stock solution; and combining an aqueous hydrogen peroxide solution with a stabilizing amount of the stock solution so prepared. Any desired complexing agent may be added at some point, or in parts at various points in this procedure. The novel, aqueous hydrogen peroxide solution so stabilized has surprisingly superior stability and resistance to the formation of a sludge.

Specifically, a method of stabilizing hydrogen peroxide provided by this invention comprises preparing a high pH stock solution by (a) adding to anaqueous solution between 5 grams per liter (g./l.) and 60 g./l. of a water-soluble tin compound, (b) adjusting the pH of the solution to above 12 and preferably about 14 with a suitable caustic such as sodium hydroxide, and (c) combining the stock solution so prepared with an aqueous hydrogen peroxide solution whereby a stabilized hydrogen peroxide solution is formed that is highly resistant to breakdown of the stabilizing chemicals into a sludge. It is preferred to add a complexing agent to the stock solution and/or to the hydrogen peroxide solution.

The critical feature of this invention is in the preparation of the stock solution to be used for stabilizing the hydrogen peroxide solution. The critical aspect of the preparation of stock solution is raising the pH of the stock solution containing the water-soluble tin compound to above 12 before the stock solution is added to the hydrogen peroxide solution.

The pH of the stock solution, as used herein, is the apparent pH as measured with a glass electrode. The pH values for hydrogen peroxide solutions are also apparent pH values determined with a glass electrode after the hydrogen peroxide concentration has been adjusted to 35%. Since pH measurements above 12 are sometimes difficult to determine with a glass electrode, the alkalinity of the stock solution can also be specified in terms of the concentration of sodium hydroxide or its equivalent added to the stock solution. Therefore, the raising of the pH of the stock solution containing a water-soluble tin compound is also defined as the addition of at least 0.1 part of 50% sodium hydroxide solution or its equivalent per 80 parts of stock solution, with 20 parts of 50% NaOH solution per 80 parts stock solution being preferred. Other caustics that are inert to hydrogen peroxide are also useful to provide some or all of the hydroxyl equivalents provided by the sodium hydroxide; such caustics include potassium hydroxide and ammonium hydroxide.

After addition of the stock solution to the hydrogen peroxide solution, the pH of the hydrogen peroxide solution is preferably adjusted to about the natural pH of an unstabilized hydrogen peroxide solution having the same hydrogen peroxide concentration or a somewhat lower pH. For a 35% hydrogen peroxide solution, the natural pH when measured with a glass electrode is about 3.7. The pH of the hydrogen peroxide solution or the pH of the stock solution can be adjusted downward to any desired level with a phosphonic acid, nitric acid and/or any other inorganic or organic acid which is inert toward hydrogen peroxide.

It is preferred to raise the pH of the stock solution containing the tin compound with sodium hydroxide and subsequently to lower the pH of the stabilized hydrogen peroxide solution with nitric acid because this addition of sodium hydroxide and nitric acid provides the benefit of sodium nitrate in the stabilized hydrogen peroxide solution. The presence of sodium nitrate in a stabilized hydrogen peroxide solution is desirable for its known corrosion-inhibiting properties.

The water-soluble tin compound is preferably sodium stannate ($Na_2Sn(OH)_6$). As used herein the term "water-soluble tin compound" includes tin compounds that are soluble at high pH and can hydrolyze to give tin-containing sols. Examples of useful water-soluble tin compounds are: sodium stannate, particularly the trihydrate of sodium stannate, potassium stannate, stannic sulfate, stannic nitrate, stannic oxide and metastannic acid. The ratio of tin compound to hydrogen peroxide required to substantially improve the stability of a hydrogen peroxide solution is between 0.00001:1 and 0.002:1. This required ratio of tin compound to $H_2O_2$ in the stabilized hydrogen peroxide solution is obtained by the addition of sufficient stock solution having a tin compound concentration of up to about 60 g./l. with a concentration of 25 g./l. being preferred.

A complexing agent is preferably added to the hydrogen peroxide solution either directly or to the stock solution prior to its being mixed with the hydrogen peroxide solution to be stabilized. The ratio of complexing agent to hydrogen peroxide in the stabilized solution should be between 0.0001:1 and 0.005:1 with about 0.0014:1 being preferred.

Complexing agents of the type suitable for improving the stability of tin-stabilized hydrogen peroxide solutions are well known. Examples of suitable complexing agents are pyrophosphates, organic phosphonic acid compounds, 8-hydroxyquinoline, hydroquinones, nitrilo triacetic acid, 1,2-cyclohexane diamine tetraacetic acid, asorbic acid, phytic acid, ethylene diamine tetraacetic acid, diglycolic acid, lauryl alcohol, alkyl phenols, phosphate esters and dipicolinic acid. Water-soluble salts of any of the above acids are also suitable provided the hydroxyl groups are replaced with one or more cations that do not interfere with the function of the compound as a stabilizer as defined hereinafter.

Suitable organic phosphonic acid compounds include hydroxyethylidene diphosphonic acid compounds, nitrilo tri(methylenephosphonic acid) compounds and ethylenediamine tetra(methylphosphonic acid) compounds. These organic phosphonic acid compounds can be the acid itself or the acid with one or more of the hydrogens replaced with an alkali metal, ammonium, substituted ammonium, magnesium or similar cations that do not interfere with the function of the compound as a stabilizer. The important characteristic of such a cation is that it must not catalyze the decomposition of hydrogen peroxide to any significant extent or precipitate the stannate sol. When more than one hydrogens are so replaced, the replacement cations may be the same or different.

The hydrogen peroxide solution to be stabilized can be at any desired concentration; however, preferred practice is to stabilize concentrated hydrogen peroxide (70% $H_2O_2$ or higher) before dilution to other concentrations.

As used herein, all proportions are based upon weight unless otherwise specified.

The following examples demonstrate the stability and resistance to sludging obtained with this invention over a wide range of conditions and contaminant concentrations. Furthermore Example 5 contains direct comparisons of hydrogen peroxide solutions stabilized with the same chemicals but differing in the pH of the stock solution employed in stabilizing the hydrogen peroxide.

EXAMPLE 1

A high pH stock solution was prepared by adding 0.5 g. of $Na_2Sn(OH)_6$ and 4 g. of 50% sodium hydroxide solution to 14.8 ml. of deionized water (pH was about 13.8) and then diluting the mixture to 20 ml. A stabilized 70% hydrogen peroxide solution was then prepared by adding 12 ml. of the high pH stock solution and 1 g. of nitrilo tri(methylenephosphonic acid) to 1 liter of unstabilized 70% hydrogen peroxide. The pH of the stabilized hydrogen peroxide solution was adjusted to 3.0 by the addition of 1.1 g. of concentrated nitric acid.

The stability of this hydrogen peroxide solution was tested by contaminating the solution with 5 mg./l. of $Fe^{+++}$ and 0.5 mg./l. of $Cu^{++}$ and maintaining this contaminated hydrogen peroxide solution for 24 hours at 100° C. The percent of the original $H_2O_2$ that remained after 24 hours was determined and reported as stability in Table I.

The stabilized, uncontaminated hydrogen peroxide solution was also tested for resistance to sludging by preparing four samples of the stabilized hydrogen peroxide solution containing 300, 400, 500 and 600 mg. of calcium ion per liter respectively and storing the samples for one month. No precipitation was detected in these samples after one month storage.

The above procedure was repeated except that the hydrogen peroxide solution containing the contaminants was diluted to a 35% hydrogen peroxide solution before being maintained at 100° C. for 24 hours. The percent of the original hydrogen peroxide remaining after 24 hours is reported as stability in Table I.

EXAMPLE 2

A high pH stock solution was prepared by dissolving 0.5 g. of $Na_2Sn(OH)_6$ and 4 g. of 50% sodium hydroxide into 13.3 ml. of deionized water to give a pH of 13.9. Then 2 g. of a 50% solution of nitrilo tri(methylenephosphonic acid) was added to the high pH stock solution and this solution was then diluted to 20 ml. with distilled water. A stabilized 70% hydrogen peroxide solution was then prepared by (1) adding 12 ml. of the diluted stock solution to 1 liter of 70% hydrogen peroxide solution, (2) adjusting the pH to 3.0 by the addition of 2.6 g. of concentrated nitric acid, and (3) adding 0.8 g. of nitrilo tri(methylenephosphonic acid) along with 1.4 g. of 7% sodium hydroxide to maintain the pH at 3.0. The stabilities of this 70% $H_2O_2$ formulation and the formulation diluted to 35% $H_2O_2$ were then tested as in Example 1. The results are reported in Table I. A portion of the stabilized 70% hydrogen peroxide solution was diluted to 39% and tested for resistance to the formation of precipitates during storage by storing eleven samples of the solution for one month in the presence of calcium concentrations of 50, 100, 150, 200, 250, 300, 400, 500, 800, 1000 and 1500 mg. per liter of calcium ions respectively. No precipitation was detected in any of the samples.

EXAMPLE 3

Run A—outside the scope of the invention

Ten ml. of aqueous stock solution was prepared containing 0.35 g. of $Na_2Sn(OH)_6$, 1.83 g. of 50% NaOH and 1.5 g. of nitrilo tri(methylenephosphonic acid). Stabilized 70% hydrogen peroxide solution was then prepared by adding 7.7 ml. of the stock solution and 1.5 g. of nitrilo tri(methylenephosphonic acid) to 1 liter of 70% hydrogen peroxide. The pH of the stabilized 70% hydrogen peroxide was adjusted with concentrated $HNO_3$ so that the sample, when diluted to 35% hydrogen peroxide, had a pH of 3. Decomposition-inducing contaminants were then added to the 35% $H_2O_2$ sample as in Example 1. The 35% hydrogen peroxide solution was tested for stability and the result reported in Table 1.

Run 1—this invention

The procedure of Run A was repeated except that the amount of sodium hydroxide added to the stock solution was increased from 1.83 g. to 2.13 g. This raised the pH of the stock solution from 11 (Run A) to about 13. Sufficient $HNO_3$ was added to the stabilized 70% hydrogen peroxide solution so that, after dilution to 35%, a pH of 3 was obtained. The 35% hydrogen peroxide was tested for stability as in the prior examples; the result is reported in Table I.

EXAMPLE 4

The resistance of stabilized hydrogen peroxide solutions to formation of sludge was tested by comparing the stabilized 70% hydrogen peroxide solution of Run A, Example 3 with the stabilized 70% hydrogen peroxide solution of Run 1, Example 3. Four samples of the stabilized hydrogen peroxide solution of Run A were diluted with calcium nitrate solution to produce 39% $H_2O_2$ solutions containing 150, 200, 250, and 300 mg. of calcium ion per liter. Four corresponding samples were prepared from the stabilized 70% hydrogen peroxide solution of Run 1. These samples were stored for one month. After the one month storage, the samples were examined for the presence of precipitates or large amounts of suspended matter (potential sludge) by light scattering techniques. The results are reported in Table II. The significance of the numerical values reported in Table II is that low values (about 0.15–0.30) indicate very slight potential for sludging while higher values and those values followed by the letter "P" indicate a high potential for sludging. The "P" indicates that a precipitate had formed.

The above comparison is between the prior art-stabilized hydrogen peroxide and the novel composition of this invention that has been prepared with the same starting chemicals used in the prior art. The comparison of performance contained in Tables I and II proves that the stabilized hydrogen peroxide solution prepared according to this invention (Example 3, Run 1) is a novel composition over the prior art (Example 3, Run A).

TABLE I

| Example number | Stability of— | |
|---|---|---|
| | 70% $H_2O_2$ | 35% $H_2O_2$ |
| 1 | 95.4 | 78.3 |
| 2 | 95.7 | 80.8 |
| 3—Run 1 (this invention) | | 86.5 |
| 3—Run A | | 68.5 |

TABLE II.—SLUDGING RESISTANCE

| Example 4 | 150¹ | 200¹ | 250¹ | 300¹ |
|---|---|---|---|---|
| Run A | .81 | 1.72P | 1.47P | 2.00P |
| Run 1 (this invention) | .15 | .27 | .26 | .22 |

¹ Mg. Ca/l. in 39% $H_2O_2$.

EXAMPLE 5

Run 1

Twenty-five g. of $Na_2Sn(OH)_6$ was dissolved in 665 ml. deionized water. To this, 200 g. of 50% NaOH was added which resulted in a pH of 13.9. Then 83.5 g. of a 60% solution of 1-hydroxyethylidene 1,1-diphosphonic acid was added which lowered the pH to 12.7. The solution was then diluted to 1 liter with deionized water to produce a stock solution. 6.0 ml. of this stock solution was added to 500 ml. of 70% pure aqueous $H_2O_2$ followed by 0.75 g. of the 60% hydroxyethylidene diphosphonic acid solution. This $H_2O_2$ solution was diluted to 35% $H_2O_2$ and adjusted to a pH of 3.2 with 10% aqueous nitric acid to produce sample 1.

Comparative Run A

The above procedure was repeated to produce a comparative stabilized $H_2O_2$ solution (sample A) by omitting the 200 g. of 50% NaOH in the stock solution preparation which resulted in a pH of 2.0 before dilution to 1 liter. Furthermore, 10% NaOH was added rather than 10% nitric acid to adjust the pH of the 35% $H_2O_2$ to 3.2 and $NaNO_3$ was added to make the nitrate concentration in the stabilized hydrogen peroxide solution equal to that of sample 1. This results in the stabilized 35% $H_2O_2$ solutions of Run 1 and Run A having the same resulting gross concentrations.

Run 2 and Comparative Run B

Two additional runs were performed (Run 2 and Run B) by repeating the procedures above except using 140 g. KOH plus 100 g. $H_2O$ instead of 200 g. of 50% NaOH and 25 g. $Na_4P_2O_7 \cdot 10H_2O$ instead of the diphosphonic acid in the stock solution preparation. The pH of the mixture of 25 g. $Na_2Sn(OH)_6$, 765 g. $H_2O$ and 140 g. KOH was above 14. The pH of this solution after adding the 25 g. of $Na_4P_2O_7 \cdot 10H_2O$ was 13.4. Furthermore, 0.225 g. $Na_4P_2O_7 \cdot 10H_2O$ was added to the 500 ml. $H_2O_2$ solution in place of the diphosphonic acid. Both $H_2O_2$ samples (Run 2 and Run B) containing pyrophosphate required the addition of some 10% $HNO_3$ solution to adjust their pH's to 3.2. The nitrate content of the $H_2O_2$ sample B was made equal to that of the $H_2O_2$ sample 2 by addition of $NaNO_3$.

Stabilities of 35% $H_2O_2$ samples from Runs 1, 2, A and B were obtained by contaminating them with 5 mg. iron plus 0.5 mg. copper per liter (added as nitrates of the metals) and heating for 24 hours at 100° C. The percentage of the peroxygen retained (stability) is shown in Table III.

TABLE III

| Sample number | Stock pH¹ | Stability (percent) |
|---|---|---|
| 1 | 12.7 | 49 |
| A | 2.0 | 33 |
| 2 | 13.4 | 55 |
| B | 11.9 | 37 |

¹ pH value of stock solution before final dilution and addition to the $H_2O_2$ to be stabilized.

We claim:
1. A method of stabilizing hydrogen peroxide comprising:
   preparing an aqueous stock solution containing between 5 g./l. and 60 g./l. of a water-soluble tin compound;
   adjusting the pH of the stock solution to above 12 with a suitable caustic; and
   combining with an aqueous hydrogen peroxide solution a sufficient quantity of the adjusted stock solution to yield a ratio of tin compound to hydrogen peroxide of between 0.00001:1 and 0.002:1.
2. The method of claim 1 in which the pH of the stock solution is adjusted to 13.5 to 14.5 with sodium hydroxide.
3. The method of claim 2 in which the pH of the combination of aqueous hydrogen peroxide and stock solution is adjusted to within 2 pH units of an unstabilized hydrogen peroxide solution having the same hydrogen peroxide concentration.
4. The method of claim 3 in which nitric acid is used to adjust the pH of the combination.
5. The method of claim 1 in which the combination of hydrogen peroxide and stock solutions contains a com- plexing agent suitable for improving the stability of tin-stabilized hydrogen peroxide solutions.

6. The method of claim 5 in which the complexing agent is a pyrophosphate compound.

7. The method of claim 5 in which the complexing agent is a hydroxy ethylidene diphosphonic acid compound.

8. The method of claim 5 in which the complexing agent is a nitrilo tri(methylenephosphonic acid) compound.

9. The method of claim 5 in which the complexing agent is an ethylenediamine tetra(methylenephosphonic acid) compound.

References Cited
UNITED STATES PATENTS

| | | | |
|---|---|---|---|
| 3,387,939 | 6/1968 | Reilly et al. | 23—207.5 |
| 2,497,814 | 2/1950 | Elston | 23—207.5 |
| 2,004,809 | 6/1935 | Gilbert et al. | 23—207.5 |
| 3,383,174 | 5/1968 | Carnine et al. | 23—207.5 |
| 3,114,606 | 12/1963 | Meeker | 23—207.5 |

OSCAR R. VERTIZ, Primary Examiner

H. S. MILLER, Assistant Examiner